United States Patent [19]
Schulz et al.

[11] Patent Number: 5,962,579
[45] Date of Patent: Oct. 5, 1999

[54] COATING FOR CONCRETE STRUCTURES

[75] Inventors: Gerald Owen Schulz, Stow; Roger William Riffle, Massillon, both of Ohio

[73] Assignee: The Goodyear Tire & Rubber Company, Akron, Ohio

[21] Appl. No.: 09/138,315

[22] Filed: Aug. 21, 1998

Related U.S. Application Data

[60] Provisional application No. 60/060,093, Sep. 26, 1997.

[51] Int. Cl.$^6$ ...................................................... C08L 33/00
[52] U.S. Cl. ............................................................. 524/522
[58] Field of Search ............................................... 524/522

[56] References Cited

U.S. PATENT DOCUMENTS

| | | | |
|---|---|---|---|
| 3,843,584 | 10/1974 | Turck | 260/29.6 |
| 3,996,181 | 12/1976 | Hayashi | 260/29.6 |
| 4,230,810 | 10/1980 | Lattime | 526/224 |
| 4,358,403 | 11/1982 | Distler | 524/745 |
| 5,306,793 | 4/1994 | Parker | 526/213 |

*Primary Examiner*—Paul R. Michl
*Attorney, Agent, or Firm*—Alvin T Rockhill

[57] ABSTRACT

The subject invention relates to a latex blend which is particularly beneficial when utilized in manufacturing coatings for concrete structures, said latex being comprised of a blend of (1) from about 60 weight percent to about 95 weight percent of a first latex which is comprised of (a) water, (b) a polymer that is comprised of repeat units which are derived from about 30 to about 70 weight percent vinyl aromatic monomers, from about 25 to about 65 weight percent of at least one alkyl acrylate monomer, from about 1 to about 5 weight percent of acrylic acid and from about 0.4 to about 3 weight percent methacrylic acid, (c) about 0.2 phr to 0.4 phr of at least one sulfonate surfactant and (d) about 4 phr to 8 phr of at least one water-insoluble nonionic surface active agent having a hydrophilic-lipophile balance number which is within the range of about 12 to about 20 and (2) from about 5 weight percent to about 40 weight percent of a second latex which is comprised of (a) water, (b) a polymer that is comprised of repeat units which are derived from about 70 weight percent to about 100 weight percent diene monomers and from 0 weight percent to about 30 weight percent vinyl aromatic monomers and (c) an emulsifier.

23 Claims, No Drawings

COATING FOR CONCRETE STRUCTURES

This application claims the benefit of U.S. Provisional Application 60/060,093 filed Sep. 26, 1997.

BACKGROUND OF THE INVENTION

Most conventional coating resins are insoluble in water. Therefore, in general practice, they have been dissolved in a suitable organic solvent or dispersed in water with the aid of an emulsifying agent or surfactant in order to provide a coating composition suitable for application to a substrate surface. A serious disadvantage of organic solvent solutions is that they are potentially toxic, flammable and environmental pollutants.

Water-reducible coatings are highly desirable because they do not present these problems. For this reason, various water-reducible coating resins, such as the one described in U.S. Pat. No. 4,474,926, have been developed. Water-reducible coatings which utilize such resins have been developed for a variety of purposes and have been widely accepted in many applications such as highway striping paint.

U.S. Pat. No. 4,968,741 describes a coating for metal substrates which provides improved corrosion and rust resistance. Such coatings are of the water-reducible type and can be beneficially utilized in the automotive industry and other applications where good rust resistance is needed. For instance, such coatings are excellent for coating bridges and other outdoor metal structures.

There are many applications where it is highly desirable for a water-reducible coating to offer improved flexibility and ultraviolet light resistance in addition to good corrosion and rust resistance. For example, such water-reducible coatings are valuable in roof coating applications. U.S. Pat. No. 5,194,469 relates to such a water-reducible coating which offers improved flexibility and ultraviolet light resistance in addition to outstanding corrosion and rust resistance.

It is important for coatings applied to concrete structures to be strong and elastomeric. Good durability is required in order for the coating to have a long service life. Since concrete is highly prone to cracking, it is highly desirable for the coating to have the ability to bridge cracks that form in the concrete structure. In the case of metal (steel) reinforced concrete, it is also highly desirable for the coating to prevent moisture from reaching the metal reinforcing rods. However, this combination of properties has proven to be elusive.

For purposes of this patent application, an aqueous coating system is considered to be a colloidal dispersion of a resin in water which can be reduced by the addition of water and which forms a durable coating when applied to a substrate surface. The term aqueous coating system is used herein interchangeably with the term water-reducible coating. Other names which are sometimes applied to water-reducible coatings are waterborne, water-solubilized and water-dilutable.

SUMMARY OF THE INVENTION

This invention relates to a blend of latices that has outstanding characteristics for utilization in aqueous coating systems designed for concrete structures. This is because coatings that are made utilizing this blend of latices exhibit high tensile strength and excellent elongation characteristics. This gives the coating the ability to stretch and bridge over cracks that form in the concrete structure. The latex blends of this invention can also be formulated into coatings having outstanding resistance to both moisture vapor transmission and water spotting. Such coatings inhibit moisture from penetrating concrete and reaching the metal-reinforcing rods embedded therein. This is, of course, highly desirable since it helps to prevent the metal reinforcing rods for corroding. Such coatings also exhibit improved low temperature flexibility.

The present invention is based upon the unexpected finding that the tensile strength and elongation of coatings made utilizing acrylate latex-based aqueous coating systems can be greatly improved by blending the latex of a polydiene rubber into the acrylate latex. The tensile strength of coatings and films made utilizing such blends is higher than that which can be attained utilizing either the acrylate latex or the polydiene rubber latex alone. Thus, the two latices act together in a synergistic manner to yield higher tensile strength than either of the latices can attain alone. By blending the polydiene rubber latex into the acrylate latex, elongation characteristics are also enhanced.

The latex blends of this invention are made by simply mixing a polydiene rubber latex into an acrylic polymer latex which is comprised of (a) water, (b) an acrylate polymer that is comprised of repeat units which are derived from about 30 to about 70 weight percent vinyl aromatic monomers, from about 25 to about 65 weight percent of at least one alkyl acrylate monomer, from about 1 to about 5 weight percent of acrylic acid and from about 0.4 to about 3 weight percent methacrylic acid and (c) about 0.2 phr to 0.4 phr of at least one sulfonate surfactant. In most cases, the latex blends of this invention will contain from about 60 weight percent to about 95 weight percent of the acrylate polymer latex and from about 5 weight percent to about 40 weight percent of the latex of the polydiene rubber.

The present invention specifically discloses a latex blend which is particularly beneficial when utilized in manufacturing coatings for concrete structures, said latex being comprised of a blend of (1) from about 60 weight percent to about 95 weight percent of a first latex which is comprised of (a) water, (b) a polymer that is comprised of repeat units which are derived from about 30 to about 70 weight percent vinyl aromatic monomers, from about 25 to about 65 weight percent of at least one alkyl acrylate monomer, from about 1 to about 5 weight percent of acrylic acid and from about 0.4 to about 3 weight percent methacrylic acid, (c) about 0.2 phr to 0.4 phr of at least one sulfonate surfactant and (d) about 4 phr to 8 phr of at least one water-insoluble nonionic surface active agent having a hydrophilic-lipophile balance number which is within the range of about 12 to about 20 and (2) from about 5 weight percent to about 40 weight percent of a second latex which is comprised of (a) water, (b) a polymer that is comprised of repeat units which are derived from about 70 weight percent to about 100 weight percent diene monomers and from 0 weight percent to about 30 weight percent vinyl aromatic monomers and (c) an emulsifier.

The subject invention also reveals a water-reducible coating composition which is comprised of (I) a latex blend which is comprised of (1) from about 60 weight percent to about 95 weight percent of a first latex which is comprised of (a) water, (b) a polymer that is comprised of repeat units which are derived from about 30 to about 70 weight percent vinyl aromatic monomers, from about 25 to about 65 weight percent of at least one alkyl acrylate monomer, from about 1 to about 5 weight percent of acrylic acid and from about 0.4 to about 3 weight percent methacrylic acid, (c) about 0.2 phr to 0.4 phr of at least one sulfonate surfactant and (d)

about 4 phr to 8 phr of at least one water-insoluble nonionic surface active agent having a hydrophilic-lipophile balance number which is within the range of about 12 to about 20 and (2) from about 5 weight percent to about 40 weight percent of a second latex which is comprised of (a) water, (b) a polymer that is comprised of repeat units which are derived from about 70 weight percent to about 100 weight percent diene monomers and from 0 weight percent to about 30 weight percent vinyl aromatic monomers and (c) an emulsifier; (II) a wetting agent; and (III) a defoamer.

DETAILED DESCRIPTION OF THE INVENTION

The latex blends of this invention are made by simply mixing from about 5 weight percent to about 40 weight percent of a polydiene rubber latex into from about 60 weight percent to about 95 weight percent of an acrylate polymer latex. A wide variety of mixing techniques can be used to mix the two latices together. It is, however, important for the mixing procedure to result in a substantially homogeneous blend of the two latices. It is typically preferred for the latex blend of this invention to contain from about 15 weight percent to about 35 weight percent of the polydiene rubber latex into from about 65 weight percent to about 85 weight percent of the acrylate polymer latex. It is normally most preferred for the latex blend of this invention to contain from about 20 weight percent to about 30 weight percent of the polydiene rubber latex into from about 70 weight percent to about 80 weight percent of the acrylate polymer latex. A polydiene rubber latex that is suitable for use in practicing the process of this invention is sold by The Goodyear Tire & Rubber Company as Pliolite® LPF 7528 and an acrylate polymer latex that is suitable for utilization in the process of this invention is sold by The Goodyear Tire & Rubber Company as Pliotec® 7217 latex.

The latex blend formed can be diluted with additional water to the concentration (solids content) that is desired. This latex blend can then be used in the preparation of water-reducible coatings using techniques well-known to those skilled in the art. Generally, various pigments and plasticizers are added to the latex blend in the preparation of the water-reducible coating.

An ambient temperature, film-forming, water-reducible composition, such as a paint, can be prepared by mixing the latex blend, one or more pigments and a surfactant or wetting agent. It is not necessary to include a coalescing solvent in the film-forming, water-reducible formulation. For environmental reasons, it is preferred not to include a coalescing solvent in the formulation. However, a small amount (0 to about 50 grams per liter) of coalescing solvent can be included. In cases where a coalescing solvent is employed, it is preferable for it to be at least water-miscible and even more preferable for it to be water-soluble. Of the various coalescing solvents which can be used, generally the ethylene glycol monobutyl ether, ethylene glycol monoethyl ether, diethylene glycol monomethyl ether, diethylene glycol monoethyl ether and diethylene glycol monobutyl ether are preferred.

It should be noted that the pigment, plasticizer and optionally the coalescing solvent can be mixed directly with the latex blend. This eliminates the need to recover the polymer in its dry form. In such an operation, the composite would automatically be in a water-reduced form when sufficient ammonia is used. Such water-reducible coating compositions will also typically contain a defoamer (antifoam agent) and a wetting agent.

Paint formulations can be made utilizing the latex blends of this invention. Such paint formulations are comprised of one or more pigments and the latex blend. Such paints can optionally contain fillers, plasticizers, wetting agents, stabilizers, defoamers, dryers, antibacterial agents, fungicides, insecticides, antifouling agents and anticorrosive agents.

Pigments are normally added to paint formulations to impart color and hiding power to the coating. Titanium dioxide is an example of a widely used pigment which imparts hiding power and a white color. Mineral pigments (such as oxides of iron and chromium), organic pigments (such as phthalocyanine) and active anticorrosive pigments (such as zinc phosphate) are representative examples of other widely used pigments.

Fillers are normally inexpensive materials which are added to the paint formulation to attain the desired consistency and non-settling characteristics. Fillers can also improve a coating's physical properties, such as resistance to cracking and abrasion. Some representative examples of widely utilized fillers include chalks, clays, micas, forms of barites and talcs, and silica.

Driers are chemical compounds (such as salts of cobalt, lead, manganese, barium and zinc) which speed up drying. Stabilizers are chemical agents which neutralize the destructive effects of heat and ultraviolet light. Fungicides and insecticides are commonly added to interior and exterior house paints. Antifouling compounds are commonly added to marine paints to inhibit marine growth. Plasticizers are agents which control the hardness of the film or which impart flexibility.

Of the various plasticizers, it is desired that one be selected which is liquid at room temperature such as 25° C. and have a sufficiently high boiling point, preferably at least 100° C., and even more preferably, at least 150° C., so that they do not volatilize from the coating composition when applied to a substrate. Indeed, the plasticizer should enhance the water insolubility of a dried coating of the coalesced resins. Further, the plasticizer, or mixture of plasticizers, must be characterized by being compatible with the resins themselves. For this characterization, a solubility parameter in the range of about 8 to about 16 is normally required. Such solubility parameter is of the type described in The Encyclopedia of Polymer Science and Technology, Volume 3, Page 854, 1965, John Wiley and Sons, Inc., which is simply determined by the equation:

$$\sigma = (\Sigma F)/V = F/MW/d,$$

where $\sigma$=solubility parameter

F=sum of the pertinent molar attraction constants of groups determined by Small, P A [(J Appl Chem 3, 71, (1953)]

V=Molar volume at 25° C.

MW=molecular weight d=density at 25° C.

Various plasticizers can be used for this purpose. They can, for example, be of the type listed in the Federation Series on Coatings Technology, Unit 22, entitled "Plasticizers," published April 1974, so long as they fulfill the melting point, boiling point and compatibility requirements.

Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethyl-hexanoate), triethylene glycol dipelargonate and 2,2,4-trimethyl-1,3-pentane diol diisobutyrate.

Additional various plasticizers, cyclic, acyclic and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly($\alpha$-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or $\alpha$-methyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2 (chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthalate, dimethyl phthalate dioctyl phthalates, di(2-ethylhexyl) phthalate, diisooctyl phthalate, di-tridecyl phthalate, n-hexyl n-decyl phthalate, n-octyl n-decyl phthalate, alkyl benzyl phthalate, bis(4-methyl-1,2-pentyl) phthalate, butyl benzyl phthalate, butyl cyclohexyl phthalate, di(2-butoxyethyl) phthalate, dicyclohexyl isodecyl phthalate, dicyclohexyl phthalate, diethyl isophthalate, di n-heptyl phthalate, dihexyl phthalate, diisononyl phthalate, di(2-methoxyethyl) phthalate, dimethyl isophthalate, dinonyl phthalate, dioctyl phthalates, dicapryl phthalate, di(2-ethylhexyl) isophthalate, mixed dioctyl phthalates, diphenyl phthalate, 2-(ethylhexyl) isobutyl phthalate, butyl phthalyl butyl glycolate, ethyl (and methyl) phthalyl ethyl glycolate, polypropylene glycol bis(amyl) phthalate, hexyl isodecyl phthalate, isodecyl tridecyl phthalate and isooctyl isodecyl phthalate.

Representative of trimellitic acid esters are triisooctyl trimellitate, tri-n-octyl n-decyl trimellitate, trioctyl trimellitate, tri(2-ethylhexyl) trimellitate, tri-n-hexyl n-decyl trimellitate, tri-n-hexyl trimellitate, triisodecyl trimellitate and triisononyl trimellitate.

Representative of various adipic acid esters are di[2-(2-butoxyethoxy) ethyl] adipate, di(2-ethylhexyl) adipate, diisodecyl adipate, dioctyl adipates (including diisooctyl adipate) n-hexyl n-decyl adipate, n-octyl n-decyl adipate and di-n-heptyl adipate.

Representative examples of sebacic acid esters are dibutyl sebacate, di(2-ethylhexyl) sebacate, dibutoxyethyl sebacate, diisooctyl sebacate and diisopropyl sebacate.

Representative examples of azelaic acid esters are di(2-ethylhexyl) acelate dicyclohexyl acelate, diisobutyl azelate and diisooctyl azelate. In the practice of this invention, the water-reducible composition of resin, plasticizer and coalescing solvent, if used, is water-reduced by neutralizing the carboxyl groups of the resin with ammonia and mixing with water. The resulting dispersion or solution can generally be characterized by being stable without appreciable, if any, precipitation of the resin for a period of at least 30 days and preferably for a period of at least 365 days or more at about 25° C.

Generally, for the purpose of this invention, about 100 to about 400 parts by weight water are used per 100 parts by weight neutralized resin, although more or less water can usually be used depending on whether a high or low viscosity dispersion or solution is desired or whether a high or low solids content is desired. It also depends on the type and amount of coalescing solvent (if any) and plasticizer used. The water-reduced coating composition, as an aqueous dispersion or solution, is applied as a coating onto a suitable substrate such as wood, masonry, various plastics and various metals. The water, ammonia and coalescing solvent are evaporated from the coating, usually at a temperature in the range of about 20° C. to about 100° C., preferably about 25° C. to about 50° C., to leave a substantially water-insoluble coating of the coalesced resin and plasticizer. Generally, such a coating can be prepared and applied without the need for additional hardening agents or curatives to decrease the water-sensitivity.

Therefore, it is an important feature of this invention that a durable coating is formed on a substrate through the preparation of a particular resin having balanced hydrophilic and hydrophobic elements, preferably with a further balance of hard and soft segments, and the formation of a water-reduced composition of such resin with a combination of pigment and compatible plasticizer.

The Acrylate Polymer Latex

The acrylate polymer latex utilized in making the latex blends of this invention can be prepared by free radical emulsion polymerization using a unique combination of surfactant, cosolvent and monomeric ingredients. The process utilized in making such latices specifically involves: (1) free radical aqueous emulsion polymerizing, at a pH of less than about 3.5, a monomer mixture which comprises, based on 100 weight percent monomers: (a) from about 30 to about 70 weight percent vinyl aromatic monomers, (b) from about 25 to about 65 weight percent of at least one alkyl acrylate monomer, (c) from about 1 to about 5 weight percent of acrylic acid and (d) about 0.4 to about 3 weight percent methacrylic acid; in the presence of about 0.2 to 0.4 phm of at least one sulfonate surfactant and in the presence of about 4 to 8 phm of at least one water-insoluble nonionic surface active agent having a hydrophilic-lipophile balance number which is within the range of about 12 to about 20 to produce a latex; and (2) neutralizing the latex with ammonia to a pH which is within the range of about 7 to about 10.5 to produce the neutralized latex.

In the synthesis of the acrylate latex, monomeric ingredients can be fed into the reaction media continuously throughout the course of the polymerization reaction to produce a more uniform composition and to avoid the formation of water-soluble block copolymers of the carboxylic acid group containing monomers. The sulfonate surfactant found most useful in the practice of this invention is sodium dodecyl benzene sulfonate. Triton® X-165 is a highly preferred nonionic surface active agent which is available from Rohm and Haas. Triton® X-165 has a hydrophile-lipophile balance number which is calculated to be 15.8.

The acrylate polymer latex is typically synthesized by free radical emulsion polymerization utilizing a charge composition that contains monomers, at least one sulfonate surfactant, at least one water-insoluble nonionic surface active agent having a hydrophilic-lipophile balance number which is within the range of about 12 to about 20 and at least one free radical initiator. The monomer charge composition used in such polymerizations is comprised of (a) from about 30 to about 70 weight percent vinyl aromatic monomers, (b) from about 25 to about 65 weight percent of at least one alkyl acrylate monomer, (c) from about 1 to about 5 weight percent of acrylic acid and (d) from about 0.4 to about 3 weight percent methacrylic acid. It is preferred for the acrylate polymer being synthesized to be comprised of from about 40 to about 60 weight percent vinyl aromatic monomers, from about 35 to about 55 weight percent alkyl acrylate monomers, from about 1 to about 3 weight percent acrylic acid and from about 0.6 to about 2 weight percent methacrylic acid. It is more preferred for the acrylate polymer to be comprised of from about 47 weight percent to 57 weight percent vinyl aromatic monomers, from about 40 to about 50 weight percent alkyl acrylate monomers, from about 1.5 to about 2.5 weight percent acrylic acid and from about 0.8 to about 1.5 weight percent methacrylic acid.

Some representative examples of vinyl aromatic monomers which can be used include styrene, alpha-methyl styrene and vinyl toluene. Styrene and alpha-methyl styrene are the preferred vinyl aromatic monomers. Due to its relatively low cost, styrene is the most preferred vinyl aromatic monomer. The alkyl acrylate monomers which can be employed have alkyl moieties which contain from 2 to about 10 carbon atoms. The alkyl acrylate monomer will preferably have an alkyl moiety which contains from 3 to 5 carbon atoms. Normal butyl acrylate is a highly preferred alkyl acrylate monomer.

The charge composition used in the preparation of the acrylate latex will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.2 phm (parts per hundred parts of monomer) to about 0.4 phm of at least one sulfonate surfactant. At least about 0.2 phm of the sulfonate surfactant must be employed because the utilization of lesser amounts results in very slow rates of polymerization and a particle size which is too large to be used in making good films. It is not desirable to utilize more than about 0.4 phm of the sulfonate surfactant because poor freeze-thaw stability results. It is normally preferred for the sulfonate surfactant to be present in the polymerization medium at a level within the range of about 0.25 phm to about 0.35 phm. It is generally more preferred for the charge composition to contain from about 0.28 to about 0.32 phm of the phosphate ester surfactant.

The sulfonate surfactants that are useful in this invention are commercially available from a wide variety of sources. For instance, DuPont sells sodium alkylarylsulfonate under the tradename Alkanol±, Browning Chemical Corporation sells sodium dodecylbenzene sulfonates under the tradename Ufaryl± DL-85 and Ruetgers-Nease Chemical Company sells sodium cumene sulfonate under the tradename Naxonate Hydrotrope±. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

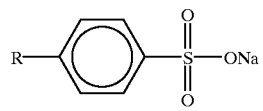

wherein R represents an alkyl group containing from 1 to about 20 carbon atoms. It is preferred for the alkyl group to contain from about 8 to about 14 carbon atoms.

Nonionic surfactants having a hydrophile-lipophile balance (HLB) number of about 12 to about 20 can be utilized as the water-insoluble nonionic surface active agent. It is generally preferred for such nonionic surfactants to have a HLB number which is within the range of about 14 to about 18. This is because the utilization of nonionic surfactants having HLB numbers of less than about 12 results in the formation of gel during polymerization. The utilization of nonionic surfactants having HLB numbers of greater than 20 results in water-sensitivity. It is more preferred for the nonionic surfactant to have an HLB number which is within the range of 15 to 17.

HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. The HLB numbers referred to herein are determined or calculated for the reaction temperature employed. Water-insoluble nonionic surfactants which contain low levels (from about 8 to about 50) ethylene oxide repeat units can be employed. These water-insoluble nonionic surfactants can have the structural formula:

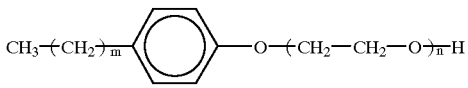

wherein n is an integer from about 8 to about 50 and wherein m is an integer from about 6 to about 12. It is normally preferred for m to be 8 or 9 and for n to average from 12 to 20. Rohm & Haas sells a nonionic surfactant of this type wherein n averages 16 under the tradename Triton± X-165. The HLB number of such compounds increases with increasing levels of ethylene oxide incorporation. The HLB number of such compounds increases as a function of n as follows:

| n | HLB Number |
|---|---|
| 1 | 3.6 |
| 3 | 7.8 |
| 4 | 10.4 |
| 10 | 13.5 |
| 16 | 15.8 |
| 30 | 17.3 |
| 40 | 17.9 |

The use of larger amounts of sulfonate surfactants in the polymerization medium leads to better latex stability. However, the utilization of larger amounts of sulfonate surfactants also leads to greater blushing in the ultimate coating and consequently less rust and corrosion resistance. The utilization of greater amounts of the water-insoluble nonionic surface active agent leads to less latex stability but also results in less blushing and more water resistance (less water permeability). Accordingly, it is important to balance the amounts of sulfonate surfactant and nonionic surface active agent utilized in the charge composition. As a general rule, from about 4 to about 8 phm of the nonionic surface active agent will be utilized. At least about 4 phm of the nonionic surface active agent will be utilized. At least about 4 phm of the nonionic surface active agent is required to get good freeze-thaw resistance and the utilization of amounts in excess of about 8 phm results in poor water resistance. It is normally preferred to utilize from 4.5 phm to 6 phm of the nonionic surface active agent.

The free radical aqueous emulsion polymerizations used in preparing the acrylate latex are initiated with at least one free radical generator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like; the various alkyl perketals, such as 2,2-bis-(t-butyl-peroxy)butane, and the like. Water-soluble peroxygen-free radical initiators are especially useful in such aqueous polymerizations.

The emulsion polymerizations utilized in the synthesis of the acrylate latex are typically carried out at the temperature ranging between about 125° F. (52° C.) and 190° F. (88° C.). At temperatures above about 88° C., alkyl acrylate monomers (such as butyl acrylate) have a tendency to boil. Thus, a pressurized jacket would be required for heating such alkyl acrylate monomers to temperatures in excess of about 88° C. On the other hand, the polymerization reaction proceeds at a very slow rate at temperatures below about 52° C. The slow rate of polymerization experienced at temperatures below about 52° C. results in the polymer having a nonuniform distribution of repeat units in its backbone. The slow rates of polymerization experienced at such low temperatures are also undesirable because they greatly reduce the throughput of the polymerization reactor.

It is generally preferred for the polymerization temperature to be maintained within the range of about 130° F. (54° C.) to 185° F. (85° C.). It is generally more preferred for the reaction temperature to be controlled within the range of about 135° F. (57° C.) to about 175° F. (79° C.). It is important for the polymerization to be conducted at a pH which is below about 3.5 so that a water-sensitive polymer is not produced. It is preferred for the pH of the polymerization medium to be maintained at a level of about 3.0 or less throughout the polymerization. As the polymerization proceeds, the pH of the polymerization medium will drop naturally. Thus, good results can be attained by adjusting the pH of the initial monomer charge composition to within the range of about 3.0 to about 3.5 and allowing the polymerization to proceed. In such a case, the final pH of the polymerization medium will be about 1.5, which is highly satisfactory.

In commercial operations, it is typically desirable to add about 15 percent to about 25 percent of the monomers in an initial charge. The initial charge is then allowed to react for a period of about 30 minutes to about 60 minutes. Then the balance of the monomers to be charged can be continuously charged into the reaction zone at a rate which is sufficient to maintain a reaction temperature within the desired temperature range. By continuously adding the monomers to the reaction medium while maintaining a relatively constant reaction temperature, very uniform polymers can be prepared.

The acrylate latex synthesized is then neutralized with ammonia to a pH within the range of about 7 to about 10.5. It is normally preferred for the acrylate polymer latex to be neutralized to a pH within the range of 8 to 10 and more preferred for the acrylate latex to be neutralized to a pH within the range of about 9.0 to about 9.5. This can be accomplished by simply dispersing ammonia throughout the latex to produce neutralized acrylate latex.

The Polydiene Rubber Latex

The polydiene latex utilized in latex blends of this invention is the latex of a polydiene rubber. Such polydiene rubbers are comprised of repeat units which are derived from at least one conjugated or nonconjugated diene monomer. Such diene monomers will typically be conjugated diene monomers which contain from about 4 to about 8 carbon atoms, such as 1,3-butadiene or isoprene. Such polydiene rubber can also include repeat units which are derived from other types of monomers which are copolymerizable with the diene monomers. For instance, vinyl aromatic monomers, such as styrene or α-methylstyrene, can be copolymerized with diene monomers to prepare rubber latices which are useful in the present invention. For instance, styrene-butadiene rubber (SBR) latex can be employed. In most cases, such styrene-butadiene latex will contain from about 1 weight percent to about 35 weight percent styrene and from about 65 weight percent to about 99 weight percent butadiene. It is more typical for the styrene-butadiene latex to contain from about 10 weight percent to about 30 weight percent styrene and from about 70 weight percent to about 90 weight percent butadiene. It is generally preferred for the styrene-butadiene latex to contain from about 15 weight percent to about 25 weight percent styrene and from about 75 weight percent to about 85 weight percent butadiene.

The polydiene rubber latex utilized in accordance with this invention can be synthesized using conventional emulsion polymerization techniques. Such emulsion polymerizations generally utilize a charge composition which is comprised of water, one or more diene monomers, optionally additional copolymerizable monomers, an initiator and an emulsifier (soap). Such polymerizations can be conducted over a very wide temperature range from about 0° C. to as high as about 100° C. Such emulsion polymerizations are typically conducted at a temperature which is within the range of about 5° C. to about 60° C.

The emulsifiers used in such free radical polymerizations may be charged at the outset of the polymerization or may be added incrementally or proportionately as the reaction proceeds. Anionic, cationic or nonionic emulsifiers may be employed. However, sulfonate surfactants are highly preferred. Some representative examples of preferred sulfonate surfactants include alkane sulfonates, esters and salts, such as alkylchlorosulfonates with the general formula:

wherein R is an alkyl group having from 1 to 20 carbon atoms, and alkylsulfonates with the general formula:

wherein R is an alkyl group having from 1 to 20 carbon atoms; sulfonates with intermediate linkages such as ester and ester-linked sulfonates such as those having the formula:

and

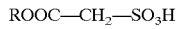

wherein R is an alkyl group having from 1 to 20 carbon atoms such as dialkyl sulfosuccinates; ester salts with the general formula:

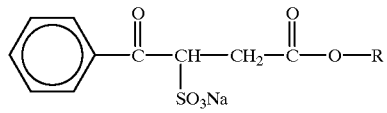

wherein R is an alkyl group having from 1 to 20 carbon atoms, alkarylsulfonates in which the alkyl groups contain preferably from 10 to 20 carbon atoms, e.g., dodecylbenzenesulfonates, such as sodium dodecylbenzenesulfonate; and alkyl phenol sulfonates.

Disulfonated surfactants having the structural formula:

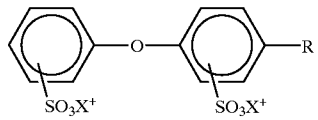

wherein R represents a linear or branched alkyl group containing from about 6 to about 16 carbon atoms and wherein X represents a metal ion, such as a sodium ion, have proven to be excellent surfactants for making the latex used in the practice of this invention. Such surfactants are sold by The Dow Chemical Company as Dowfax™ anionic surfactants.

The emulsion polymerizations used in synthesizing the polydiene rubber latices may be initiated using free radical catalysts, ultraviolet light or radiation. To insure a satisfactory polymerization rate, uniformity and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like.

The emulsion polymerization system used in the synthesis of the polydiene rubber latex can be treated at the desired degree of conversion with shortstopping agents, such as hydroquinone. Typical stabilizing agents and standard antioxidants can also be added to the latex.

The latex used will typically have a solids content within the range of about 2 percent to about 45 percent (based on weight). It is more typical for the latex to have a solids content within the range of about 5 to about 30 weight percent with it generally being preferred for the latex to have a solids content which is within the range of about 10 weight percent to about 20 weight percent.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, a polydiene latex (polybutadiene latex) which is suitable for utilization in making the latex blends of this invention was synthesized. This polybutadiene latex was prepared in a 10-gallon (37.9 liter) reactor. The reactor was equipped with two 6-inch (15.24 cm) axial flow turbines with baffles.

A soap solution/buffer charge was prepared by mixing 27.8 pounds (12.16 kg) of water, 0.4 pounds (0.18 kg) of Aerosol™ A-196 (85 percent active), 0.44 pounds (0.20 kg) of Dowfax™ XD 8390 (35 percent active), 0.04 pounds (0.018 kg) of ammonium sulfate, 0.03 pounds (0.014 kg) of a 3 percent aqueous solution of ferric sulfate heptahydrate, 0.024 pounds (0.011 kg) of sodium formaldehyde sulfoxylate and 2 grams of sodium hydrosulfite (an oxygen scavenger) to a mixing vessel. The pH of the soap solution was determined to be within the range of 6 to 7. Then, 0.034 pounds (0.015 kg) of t-dodecylmercaptan was charged into the mixing vessel. The contents of the mixing vessel were then drawn into the reactor by vacuum. The reactor was then degassed with vacuum and flushed with nitrogen several times to eliminate any oxygen.

The temperature of the reactor was set to 70° F. (21.1° C.) and 20 pounds (9.07 kg) of 1,3-butadiene monomer was charged directly into the reactor. At that point, 0.1 pounds (0.045 kg) of α-pinene hydroperoxide (40 percent active) was charged directly into the reactor with agitation being provided at 150 rpm. After about 10 hours of polymerization time, an additional charge containing 0.05 pounds (0.023 kg) of α-pinene hydroperoxide (40 percent active) and 0.01 pounds (0.004 kg) of sodium formaldehyde sulfoxylate was charged into the reactor to maintain polymerization rates. After the solids content reached about 31 percent (after about 16 hours of polymerization time), a shortstop solution was introduced into the reactor. The shortstop solution contained 0.02 pounds (0.009 kg) of N,N-diethyldithiocarbamate, 0.01 pounds (0.005 kg) of N,N-diethylhydroxylamine and 1.6 pounds (0.73 kg) of water. Residual butadiene monomer was then removed from the reaction vessel. The polybutadiene latex was then filtered and its pH was adjusted with ammonium hydroxide to be within the range of 7.5 to 8.0.

EXAMPLE 2

In this experiment, an acrylate latex which is suitable for utilization in making the blends of this invention was prepared in a 10-gallon (37.8 liter) reactor. The reactor utilized in this experiment was equipped with axial flow turbine-type agitation and was operated at 150 rpm (revolutions per minute). A buffer solution and a monomer solution were made for utilization in the polymerization. The buffer solution was made by mixing 14.3 kilograms of water with 47.6 grams of the sodium dodecylbenzene sulfonate having a pH of about 6.5, 794 grams of Triton± X-165, 235 grams of sodium acid pyrophosphate (as a buffer) and 32 grams of ammonium persulfate. The monomer solution was prepared by mixing 8.3 kilograms of styrene, 16 grams of dodecylmercaptan, 7.1 kilograms of 2-ethylhexylacrylate, 318 grams of acrylic acid and 159 grams of methacrylic acid.

After the reactor had been evacuated for 30 minutes, the buffer solution was charged into the reactor. Then, the monomer solution was charged into the reactor. The reactor was heated to a temperature of 135° F. (57° C.). Latex samples were taken as the polymerization proceeded to determine the solids content of the latex. The solids content of the latex increased during the course of polymerization as shown in Table I.

TABLE I

| Polymerization Time (Hours) | Solids Content |
| --- | --- |
| 0 | 0 |
| 2 | 8 |
| 4 | 11.1 |

TABLE I-continued

| Polymerization Time (Hours) | Solids Content |
| --- | --- |
| 6 | 14.7 |
| 8 | 18.4 |
| 10 | 21.5 |
| 12 | 27.7 |
| 14 | 35.3 |
| 16 | 45.5 |
| 17 | 50.3 |
| 18 | 54.0 |
| 19 | 56.3 |
| 21 | 56.9 |

After the latex reached a constant solids content, the temperature was increased to 175° F. (79° C.) and maintained until the level of residual styrene monomer dropped to less than 0.05 percent. Then, 250 grams of amine was added.

The acrylate latex made utilizing this procedure had a final solids content of about 57 percent, a pH of about 9.5, a Brookfield viscosity of 300 centipoise, a surface tension of 36 dynes/cm and passed five cycles of freeze-thaw stability testing. Films were cast from the acrylate latex for tensile testing and UV resistance testing. The resin proved to have excellent UV resistance and exhibited elongations to break of over 500 percent. The latex exhibited an excellent combination of properties for use in roof coating applications, exterior wood coating applications, flexible metal coating applications and plastic coating applications. However, it would be highly desirable to further improve elongation and tensile strength for certain applications, such as coatings for concrete.

It should be noted that the water resistance of coatings made with this acrylate latex can be improved by treating the coating composition with a carbodiimide. UCARLNK± Crosslinker XL-25SE from Union Carbide is a multifunctional carbodiimide that is well suited for this purpose. By utilizing such carbodiimides, water spotting and blushing can be virtually eliminated. As a general rule, the carbodiimide is added to the acrylate latex or coating composition in an amount which is within the range of about 10 phr to about 20 phr.

EXAMPLES 3–13

In this series of experiments, latex blends were prepared by mixing Pliolite® 7528 styrene-butadiene latex, Pliotec® 7217 acrylate polymer latex, FC-129 fluorocarbon-based surfactant/wetting agent (from 3M), L-405 silicone defoamer (from Ashland/Drew, Inc) and Alcogum 6625 polyacrylate thickener. The ratio of the acrylate polymer latex to the polydiene rubber latex utilized in each of these experiments is reported in Table II. It should be noted that Example 3 and Example 13 were controls which contained only the acrylate polymer latex or only the polydiene rubber latex. In each of these examples, the FC-129 fluorocarbon-based surfactant/wetting agent was mixed into the latex blend at a concentration of 0.1 weight percent and the L-405 silicone defoamer was also mixed into the latex blend at a concentration of 0.1 weight percent, based upon the total weight of the latex blend. In making all of these latex blends, the Alcogum 6625 polyacrylate thickener was added as a 5 percent aqueous solution in an amount which was sufficient to thicken the blend to 2 MCps.

Each of the latex blends made and the controls were cast into films which were tested to determine elongation, tensile strength and modulus at 500 percent elongation. These physical properties are reported in Table II.

TABLE II

| Example | 7217/7528 Ratio | Elongation | Tensile (Pa) | Modulus (Pa) |
|---|---|---|---|---|
| 3 | 100/0 | 613% | $0.92 \times 10^6$ | $1.16 \times 10^6$ |
| 4 | 95/5 | 717% | $2.06 \times 10^6$ | $0.99 \times 10^6$ |
| 5 | 90/10 | 736% | $2.31 \times 10^6$ | $1.02 \times 10^6$ |
| 6 | 85/15 | 697% | $2.70 \times 10^6$ | $1.32 \times 10^6$ |
| 7 | 80/20 | 695% | $2.86 \times 10^6$ | $1.37 \times 10^6$ |
| 8 | 75/25 | 675% | $3.11 \times 10^6$ | $1.59 \times 10^6$ |
| 9 | 70/30 | 646% | $2.99 \times 10^6$ | $1.81 \times 10^6$ |
| 10 | 65/35 | 636% | $2.92 \times 10^6$ | $1.81 \times 10^6$ |
| 11 | 50/50 | 494% | $1.07 \times 10^6$ | $1.33 \times 10^6$ |
| 12 | 25/75 | 644% | $0.43 \times 10^6$ | $0.43 \times 10^6$ |
| 13 | 0/100 | 1212% | $0.27 \times 10^6$ | $0.25 \times 10^6$ |

As can be seen from Table II, the tensile strength attained in Examples 4–11 was higher than that exhibited in either of the controls (Examples 3 and 13). This shows that the latices in the blends of this invention acted synergistically to attain higher tensile strengths. It should also be noted that the modulus attained in Examples 6–11 was also higher than that exhibited in either of the controls. This again shows that the latices were acting synergistically. It should also be noted that the addition of the polydiene rubber latex increased elongation of the films made with the blends to higher levels.

While certain representative embodiments and details have been shown for the purpose of illustrating the subject invention, it will be apparent to those skilled in this art that various changes and modifications can be made therein without departing from the scope of the subject invention.

What is claimed is:

1. A latex blend which is particularly beneficial when utilized in manufacturing coatings for concrete structures, said latex being comprised of a blend of (1) from about 60 weight percent to about 95 weight percent of a first latex which is comprised of (a) water, (b) a polymer that is comprised of repeat units which are derived from about 30 to about 70 weight percent vinyl aromatic monomers, from about 25 to about 65 weight percent of at least one alkyl acrylate monomer, from about 1 to about 5 weight percent of acrylic acid and from about 0.4 to about 3 weight percent methacrylic acid, (c) about 0.2 phr to 0.4 phr of at least one sulfonate surfactant and (d) about 4 phr to 8 phr of at least one water-insoluble nonionic surface active agent having a hydrophilic-lipophile balance number which is within the range of about 12 to about 20 and (2) from about 5 weight percent to about 40 weight percent of a second latex which is comprised of (a) water, (b) a polymer that is comprised of repeat units which are derived from about 70 weight percent to about 100 weight percent diene monomers and from 0 weight percent to about 30 weight percent vinyl aromatic monomers and (c) an emulsifier.

2. A water-reducible coating composition which is comprised of (I) a latex blend which is comprised of (1) from about 60 weight percent to about 95 weight percent of a first latex which is comprised of (a) water, (b) a polymer that is comprised of repeat units which are derived from about 30 to about 70 weight percent vinyl aromatic monomers, from about 25 to about 65 weight percent of at least one alkyl acrylate monomer, from about 1 to about 5 weight percent of acrylic acid and from about 0.4 to about 3 weight percent methacrylic acid, (c) about 0.2 phr to 0.4 phr of at least one sulfonate surfactant and (d) about 4 phr to 8 phr of at least one water-insoluble nonionic surface active agent having a hydrophilic-lipophile balance number which is within the range of about 12 to about 20 and (2) from about 5 weight percent to about 40 weight percent of a second latex which is comprised of (a) water, (b) a polymer that is comprised of repeat units which are derived from about 70 weight percent to about 100 weight percent diene monomers and from 0 weight percent to about 30 weight percent vinyl aromatic monomers and (c) an emulsifier; (II) a wetting agent; and (III) a defoamer.

3. A latex blend as specified in claim 1 wherein said latex blend is comprised of about 65 weight percent to about 85 weight percent of said first latex and from about 15 weight percent to about 35 weight percent of said second latex.

4. A latex blend as specified in claim 1 wherein said latex blend is comprised of about 70 weight percent to about 80 weight percent of said first latex and from about 20 weight percent to about 30 weight percent of said second latex.

5. A latex blend as specified in claim 1 wherein the polymer in the second latex is comprised of repeat units which are derived from a conjugated diolefin monomer and a vinyl aromatic monomer.

6. A latex blend as specified in claim 1 wherein the polymer in the second latex is comprised of repeat units which are derived from 1,3-butadiene monomer and a vinyl aromatic monomer.

7. A latex blend as specified in claim 6 wherein said vinyl aromatic monomer is styrene.

8. A latex blend as specified in claim 3 wherein the polymer in the second latex is styrene-butadiene rubber which contains from about 10 weight percent to about 30 weight percent styrene and from about 70 weight percent to about 90 weight percent butadiene.

9. A latex blend as specified in claim 4 wherein the polymer in the second latex is styrene-butadiene rubber which contains from about 15 weight percent to about 25 weight percent styrene and from about 75 weight percent to about 85 weight percent butadiene.

10. A latex blend as specified in claim 8 wherein the polymer in the first latex is comprised of repeat units which are derived from about 40 to about 60 weight percent vinyl aromatic monomers, from about 35 to about 55 weight percent alkyl acrylate monomers, from about 1 to about 3 weight percent acrylic acid and from about 0.6 to about 2 weight percent methacrylic acid.

11. A latex blend as specified in claim 10 wherein the vinyl aromatic monomer in the polymer of the first latex is styrene monomer.

12. A latex blend as specified in claim 11 wherein the alkyl acrylate monomer in the polymer of the first latex is n-butyl acrylate monomer.

13. A latex blend as specified in claim 12 wherein the polymer in the first latex is comprised of repeat units which are derived from about 47 to about 57 weight percent styrene monomer, from about 40 to about 50 weight percent n-butyl acrylate monomer, from about 1.5 to about 2.5 weight percent acrylic acid and from about 0.8 to about 1.5 weight percent methacrylic acid.

14. A water-reducible coating composition as specified in claim 2 wherein said latex blend is comprised of about 65 weight percent to about 85 weight percent of said first latex and from about 15 weight percent to about 35 weight percent of said second latex.

15. A water-reducible coating composition as specified in claim 2 wherein said latex blend is comprised of about 70 weight percent to about 80 weight percent of said first latex and from about 20 weight percent to about 30 weight percent of said second latex.

16. A water-reducible coating composition as specified in claim 2 wherein the polymer in the second latex is comprised of repeat units which are derived from a conjugated diolefin monomer and a vinyl aromatic monomer.

17. A water-reducible coating composition as specified in claim 2 wherein the polymer in the second latex is comprised of repeat units which are derived from 1,3-butadiene monomer and a vinyl aromatic monomer.

18. A water-reducible coating composition as specified in claim 17 wherein said vinyl aromatic monomer is styrene.

19. A water-reducible coating composition as specified in claim 14 wherein the polymer in the second latex is styrene-butadiene rubber which contains from about 10 weight percent to about 30 weight percent styrene and from about 70 weight percent to about 90 weight percent butadiene.

20. A water-reducible coating composition as specified in claim 15 wherein the polymer in the second latex is styrene-butadiene rubber which contains from about 15 weight percent to about 25 weight percent styrene and from about 75 weight percent to about 85 weight percent butadiene.

21. A water-reducible coating composition as specified in claim 19 wherein the polymer in the first latex is comprised of repeat units which are derived from about 40 to about 60 weight percent vinyl aromatic monomers, from about 35 to about 55 weight percent alkyl acrylate monomers, from about 1 to about 3 weight percent acrylic acid and from about 0.6 to about 2 weight percent methacrylic acid.

22. A water-reducible coating composition as specified in claim 21 wherein the vinyl aromatic monomer in the polymer of the first latex is styrene monomer and wherein the alkyl acrylate monomer in the polymer of the first latex is n-butyl acrylate monomer.

23. A water-reducible coating composition as specified in claim 22 wherein the polymer in the first latex is comprised of repeat units which are derived from about 47 to about 57 weight percent styrene monomer, from about 40 to about 50 weight percent n-butyl acrylate monomer, from about 1.5 to about 2.5 weight percent acrylic acid and from about 0.8 to about 1.5 weight percent methacrylic acid.

* * * * *